UNITED STATES PATENT OFFICE.

RENZO T. SARGENT AND BEN K. GALLUP, OF CLINTON, MASSACHUSETTS.

STOVE-POLISH.

SPECIFICATION forming part of Letters Patent No. 454,296, dated June 16, 1891.

Application filed April 9, 1891. Serial No. 388,287. (No specimens.)

*To all whom it may concern:*

Be it known that we, RENZO T. SARGENT and BEN K. GALLUP, citizens of the United States, residing at Clinton, in the county of Worcester and State of Massachusetts, have invented a certain new and useful Stove-Polish; and we do declare the following to be a full, clear, and exact description of the invention, such as will enable others skilled in the art to which it appertains to make and use the same.

Our invention has relation to a composition of matter designed to be used for blacking and polishing stoves, furnaces, and the like.

The invention has for its objects to produce a composition of matter which may have either a liquid, semi-liquid, or a solid consistency, according to the proportions of the ingredients thereof, and which when applied to the article and brushed or rubbed in the ordinary manner will produce a bright and lasting gloss; also, to produce a blacking composition which can be very cheaply manufactured; and with these objects in view the invention consists in the composition composed of the ingredients hereinafter specified, and pointed out in the claim.

The composition forming the subject of our invention consists of the following ingredients, to wit: black-lead, soap, (hard or soft,) black varnish, lamp-black, ivory-black, glue, and water. We do not wish to be confined to any definite proportions of these ingredients, as we have found that by varying such proportions relatively we are able to produce a blacking composition having either a liquid, semi-liquid, or a solid consistency and equally well adapted for the purpose in view and possessing alike the same advantages.

For producing a composition having an ordinary liquid consistency we use one part, by measure, of black-lead, one of soap, (hard or soft,) one of black varnish, one of lamp-black, one of ivory-black, one of glue, and one of water, which mixture may be applied to the article like ordinary liquid compositions of this character and afterward brushed or rubbed to produce a bright and lasting gloss.

By using a smaller proportion of the liquid ingredients of the composition than of the remaining ingredients the resulting mixture will have a more or less semi-liquid or pasty consistency, and by using an extremely small proportion of such liquid ingredients relatively to the other ingredients the mixture will assume a solid consistency shortly after mixing of the ingredients, and may immediately after such mixing be put into molds, so that when it hardens it will have the desired shape. In using the polish when the same is of a pasty or solid consistency it may be mixed with sufficient water to render the same sufficiently liquid to be applied to the article.

The temperature of the atmosphere will have an effect upon the composition, warm weather tending to liquefy the composition and cold weather to harden the same. Therefore we may vary the proportions of the ingredients accordingly to counteract these effects, as will be readily understood.

In practice our composition will be found admirably adapted for the purpose in view and will be capable of yielding a very bright luster, and which may be applied to the article while the latter is in either a cold or heated condition.

Having described our invention, what we claim, and desire to secure by Letters Patent, is—

The herein-described blacking composition, consisting of black-lead, soap, black varnish, lamp-black, ivory-black, glue, and water, the whole being mixed in suitable proportions, as and for the purposes specified.

In testimony whereof we have affixed our signatures in presence of two witnesses.

RENZO T. SARGENT.
     BEN K. GALLUP.

Witnesses:
 ABIJAH BROWN,
 E. M. HAWKINS.